(12) United States Patent  (10) Patent No.: US 12,124,397 B2
Moon et al.  (45) Date of Patent: Oct. 22, 2024

(54) DATA BUS INVERSION CIRCUIT AND SEMICONDUCTOR APPARATUS INCLUDING THE SAME

(71) Applicant: SK hynix Inc., Gyeonggi-do (KR)

(72) Inventors: Hong Ki Moon, Gyeonggi-do (KR); Seok Bo Shim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 61 days.

(21) Appl. No.: 18/173,791

(22) Filed: Feb. 24, 2023

(65) Prior Publication Data

US 2024/0160595 A1 May 16, 2024

(30) Foreign Application Priority Data

Nov. 10, 2022 (KR) .................. 10-2022-0149385

(51) Int. Cl.
*G06F 13/42* (2006.01)
(52) U.S. Cl.
CPC ............................. *G06F 13/4221* (2013.01)
(58) Field of Classification Search
CPC ................................................. G06F 13/4221
See application file for complete search history.

(56) References Cited

U.S. PATENT DOCUMENTS

| 2005/0127945 | A1* | 6/2005 | Park | H03K 19/00361 326/52 |
| 2010/0019814 | A1* | 1/2010 | Park | G11C 7/1066 327/162 |
| 2010/0118618 | A1* | 5/2010 | Kwak | G11C 7/1006 365/191 |
| 2010/0302847 | A1* | 12/2010 | Komai | G11C 29/846 365/189.05 |
| 2017/0237917 | A1* | 8/2017 | Sato | H04N 25/78 348/308 |
| 2018/0143922 | A1* | 5/2018 | Hong | G11C 7/222 |
| 2018/0268880 | A1* | 9/2018 | Lee | G11C 7/1063 |

FOREIGN PATENT DOCUMENTS

| KR | 10-2013-0098681 A | 9/2013 |
| KR | 10-2015-0038792 A | 4/2015 |
| KR | 10-2015-0050834 A | 5/2015 |
| KR | 10-2018-0057028 A | 5/2018 |

* cited by examiner

*Primary Examiner* — Henry Tsai
*Assistant Examiner* — Harry Z Wang
(74) *Attorney, Agent, or Firm* — IP & T GROUP LLP

(57) ABSTRACT

The present technology may include a first latch circuit configured to store, as first data, data that is transmitted through a first signal line, a second latch circuit configured to store, as a plurality of second data, the data that is transmitted through the first signal line by sorting the data by a plurality of second signal lines that are connected to the first signal line in common, and a data bus inversion engine configured to selectively perform a first mode in which the data bus inversion engine generates a data bus inversion flag by comparing the first data with current input data and a second mode in which the data bus inversion engine generates the data bus inversion flag by comparing the plurality of second data with the current input data.

22 Claims, 9 Drawing Sheets

| TM<0> | 0 (AUTOMATIC) | | 1 (MANUAL) | |
|---|---|---|---|---|
| TM<1> | X | X | 0 (MODE1) | 1 (MODE2) |
| INF_DVC | 0 (MODE1) | 1 (MODE2) | X | X |
| PG_SEL | Enable | Disable | Enable | Disable |
| BG<0:n>_SEL | Disable | Enable | Disable | Enable |
| TM<2> | 0 | 1 | 0 | 1 |
| DBI_EN | 0 | 1 | 0 | 1 |

DATA BUS INVERSION CIRCUIT AND SEMICONDUCTOR APPARATUS INCLUDING THE SAME

CROSS-REFERENCES TO RELATED APPLICATION

The present application claims priority under 35 U.S.C. § 119(e) to Korean Patent Application Number 10-2022-0149385, filed on Nov. 10, 2022, which is incorporated herein by reference in its entirety.

BACKGROUND

1. Technical Field

The present technology relates to a semiconductor circuit, and particularly, to a data bus inversion circuit and a semiconductor apparatus including the same.

2. Related Art

A semiconductor apparatus may have issues, such as simultaneous switching noise (SSN), crosstalk with an adjacent transmission line, or an increase in reference potential noise and current consumption, when transmitting a large amount of data at high speed.

In order to deal with the issues, a data bus inversion (DBI) function for improving a data processing speed by minimizing a switching count of data may be used.

The DBI function may be divided into a static method and a dynamic method. According to the static method, current data is inverted and then transmitted when the number of data having a high logic value or a low logic value, among the current data, is more than half, whereas current data is not inverted and then transmitted when the number of data having a high logic value or a low logic value, among the current data, is not more than half. According to the dynamic method, current data is compared with previous data, and the current data may be inverted based on the comparison result. The current data is inverted and then transmitted when the number of data bits the state of which have been changed, that is, the logic level of which have been changed, is more than half. The current data is not inverted and then transmitted when the number of data bits the state of which have been changed, that is, the logic level of which have been changed, is not more than half.

Many signal lines are disposed in the semiconductor apparatus. Accordingly, the DBI function should be properly applied to the signal lines.

SUMMARY

A data bus inversion circuit according to an embodiment of the present disclosure may include: a first latch circuit configured to store, as first data, data that is transmitted through a first signal line; a second latch circuit configured to store, as a plurality of second data, the data that is transmitted through the first signal line by sorting the data by a plurality of second signal lines that are connected to the first signal line in common; and a data bus inversion engine configured to selectively perform a first mode in which the data bus inversion engine generates a data bus inversion flag by comparing the first data with current input data and a second mode in which the data bus inversion engine generates the data bus inversion flag by comparing the plurality of second data with the current input data.

A semiconductor apparatus according to an embodiment of the present disclosure may include: a first global input/output line disposed in a peripheral circuit region; a plurality of second global input/output lines connected with the first global input/output line in common and disposed in a memory region; and a data bus inversion circuit configured to selectively perform a first mode in which the data bus inversion circuit stores, as first data, data that is transmitted through the first global input/output line without sorting the data by the plurality of second global input/output lines, stores, as a plurality of second data, the data that is transmitted through the first global input/output line by sorting the data by the plurality of second global input/output lines, and generates a data bus inversion flag based on a result of a comparison between the first data and current input data, and a second mode in which the data bus inversion circuit generates the data bus inversion flag based on a result of a comparison between second data, selected among the plurality of second data, and the current input data.

A semiconductor apparatus according to an embodiment of the present disclosure may include: a memory region including a plurality of memory bank groups; a peripheral circuit region connected to input/output pads; a first global input/output line connected to the peripheral circuit region; a plurality of second global input/output lines having one ends connected to the first global input/output line in common and having other ends connected to the plurality of memory bank groups, respectively; and a data bus inversion circuit configured to selectively perform a first mode in which the data bus inversion circuit stores, as first data, data that is transmitted through the first global input/output line without sorting the data by the plurality of memory bank groups, stores, as a plurality of second data, the data that is transmitted through the first global input/output line by sorting the data by the plurality of memory bank groups, and generates a data bus inversion flag based on a result of a comparison between the first data and current input data through the input/output pads and a second mode in which the data bus inversion circuit generates the data bus inversion flag based on a result of a comparison between second data, selected among the plurality of second data, and the current input data through the input/output pads.

The data bus inversion circuit according to an embodiment of the present disclosure may be configured to automatically select one of the first mode and the second mode in response to product information of the semiconductor apparatus.

The data bus inversion circuit according to an embodiment of the present disclosure may be configured to select the first mode in response to the product information that defines that a column to column delay (tCCD) value between different bank groups is greater than a tCCD value within the same bank group and to select the second mode in response to the product information that defines that a tCCD value within the same bank group is greater than a tCCD value between different bank groups.

DETAILED DESCRIPTION

Hereinafter, embodiments of the present technology will be described in detail with reference to the accompanying drawings.

In the description of examples of this application, terms, such as a "first", a "second", are used to distinguish between members and are not used to limit the members themselves or to mean a specific order. Furthermore, when it is described that any one element is "connected to" or "coupled with" another element, the any one element may be directly connected to or coupled with the another element electrically or mechanically, or the two elements may form a connection relation or a coupling relation with other separate elements interposed therebetween. In the descriptions of the following embodiments, the term "preset" indicates that the numerical value of a parameter is previously decided, when the parameter is used in a process or algorithm. According to an embodiment, the numerical value of the parameter may be set when the process or algorithm is started or while the process or algorithm is performed. A "logic high level" and a "logic low level" are used to describe the logic levels of signals. A signal having "logic high level" is distinguished from a signal having "logic low level." For example, when a signal having a first voltage corresponds to a signal having a "logic high level," a signal having a second voltage may correspond to a signal having a "logic low level." According to an embodiment, a "logic high level" may be set to a voltage higher than a "logic low level." According to an embodiment, the logic levels of signals may be set to different logic levels or opposite logic levels. For example, a signal having a logic high level may be set to have a logic low level according to an embodiment, and a signal having a logic low level may be set to have a logic high level according to an embodiment.

An embodiment of the present disclosure provides a data bus inversion circuit capable of improving efficiency of the DBI function and a semiconductor apparatus including the same.

Figure 1:
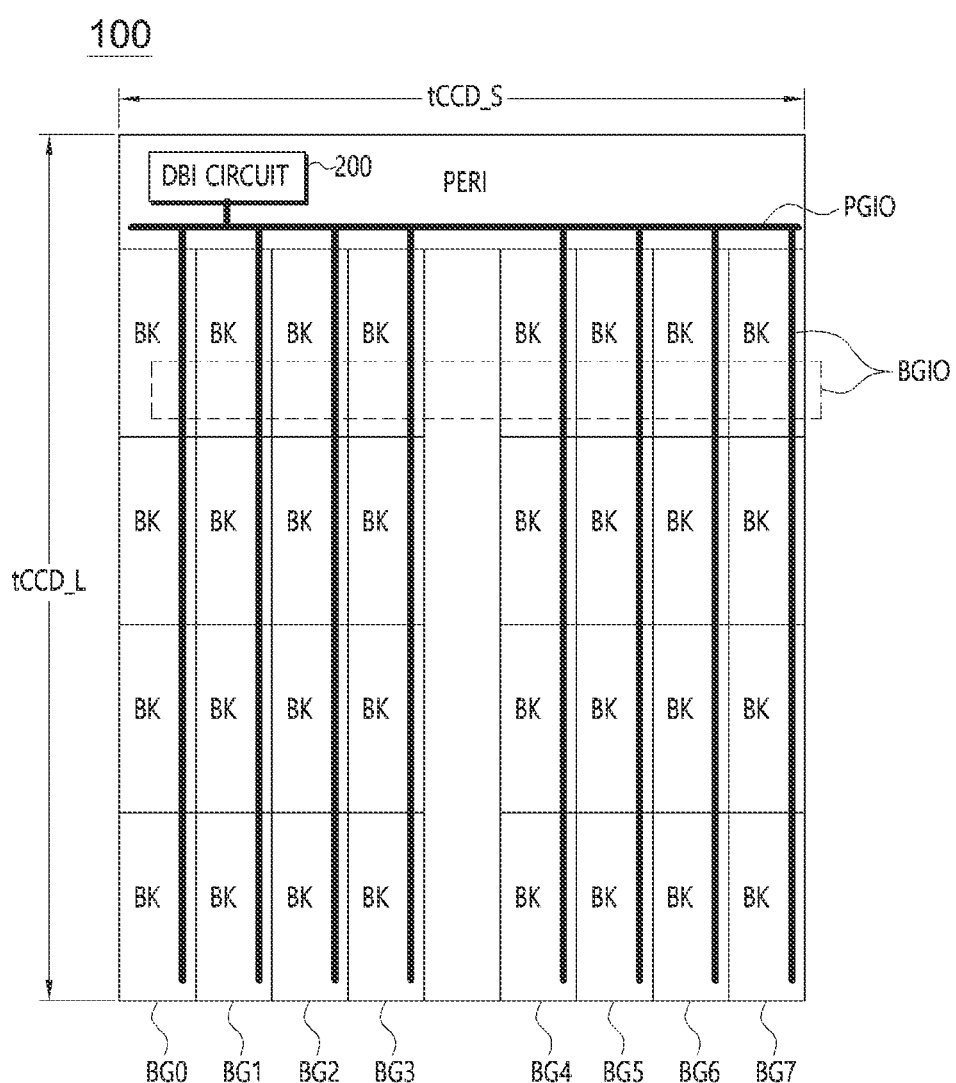
FIG. 1 is a diagram illustrating a semiconductor apparatus according to an embodiment of the present disclosure.

FIG. 1 is a diagram illustrating a semiconductor apparatus 100 according to an embodiment of the present disclosure.

Referring to FIG. 1, the semiconductor apparatus 100 may include a memory region, a peripheral circuit region PERI, a first global input/output line PGIO, and a plurality of second global input/output lines BGIO.

The memory region may include a plurality of memory bank groups BG0, BG1, BG2, BG3, BG4, BG5, BG6, and BG7 (hereinafter referred to as "BG0 to BG7"). Each memory bank group (hereinafter referred to as a "bank group") may include a plurality of memory banks BK.

The peripheral circuit region PERI may include various types of circuit elements and a data bus inversion (DBI) circuit 200 for signal interfacing with the memory region and the outside of the semiconductor apparatus 100.

A first signal line, that is, the first global input/output line PGIO, may be connected to the peripheral circuit region PERI, and may be disposed in the peripheral circuit region PERI.

A plurality of second signal lines, that is, the plurality of second global input/output lines BGIO, may have one ends connected to the first global input/output line PGIO in common, and may have the other ends connected to the bank groups BG0 to BG7, respectively.

A semiconductor apparatus, for example, a semiconductor memory apparatus may have a different design method depending on its purpose of use. For example, a memory apparatus for a mobile product and a memory apparatus for computing and graphic processing may be different in their design methods. A column to column delay (tCCD) value between different bank groups may be designed to be greater than a tCCD value within the same bank group. In contrast, a tCCD value within the same bank group may be designed to be greater than a tCCD value between different bank groups. FIG. 1 is an example in which a tCCD value (tCCD_L, wherein "L" is an abbreviation of "long") within the same bank group has been designed to be greater than a tCCD value (tCCD_S, wherein "S" is an abbreviation of "short") between different bank groups. In FIG. 1, noise and power consumption in a signal transmission process through the plurality of second global input/output lines BGIO may be greater than those through the first global input/output line PGIO. Product information may be written in the semiconductor apparatus. The product information of the semiconductor apparatus may include information by which a memory apparatus for a mobile product and a memory apparatus for computing and graphic processing can be distinguished from each other or/and information relating to a tCCD value between different bank groups and a tCCD value within the same bank group.

The DBI circuit 200 may be configured to selectively perform a first DBI mode (hereinafter referred to as a "first mode") or a second DBI mode (hereinafter referred to as a "second mode"). In the first mode, the DBI circuit 200 stores, as first data, data that is transmitted through the first global input/output line PGIO without sorting the data by the plurality of second global input/output lines BGIO. Further, the DBI circuit 200 stores, as a plurality of second data items, data that is transmitted through the first global input/output line PGIO by sorting the data by the plurality of second global input/output lines BGIO. Furthermore, the DBI circuit 200 generates a DBI flag based on a result of a comparison between the first data and current input data. In the second mode, the DBI circuit 200 generates the DBI flag based on a result of a comparison between second data, selected among a plurality of second data items, and current input data.

The DBI circuit 200 may be configured to automatically select one of the first mode and the second mode in response to product information of the semiconductor apparatus.

The DBI circuit 200 may be configured to select the first mode in response to the product information which defines that a tCCD value within the same bank group is greater than a tCCD value between different bank groups, and to select the second mode in response to the product information which defines that a tCCD value within the same bank group is greater than a tCCD value between different bank groups.

Accordingly, the semiconductor apparatus 100 according to an embodiment can automatically select a DBI mode that is suitable for a product design method, that is, the first mode and the second mode, and may enable the first mode and the second mode to be manually selected based on a product operation characteristic. Accordingly, noise and power consumption of the semiconductor apparatus can be reduced regardless of a product type.

Figure 2:
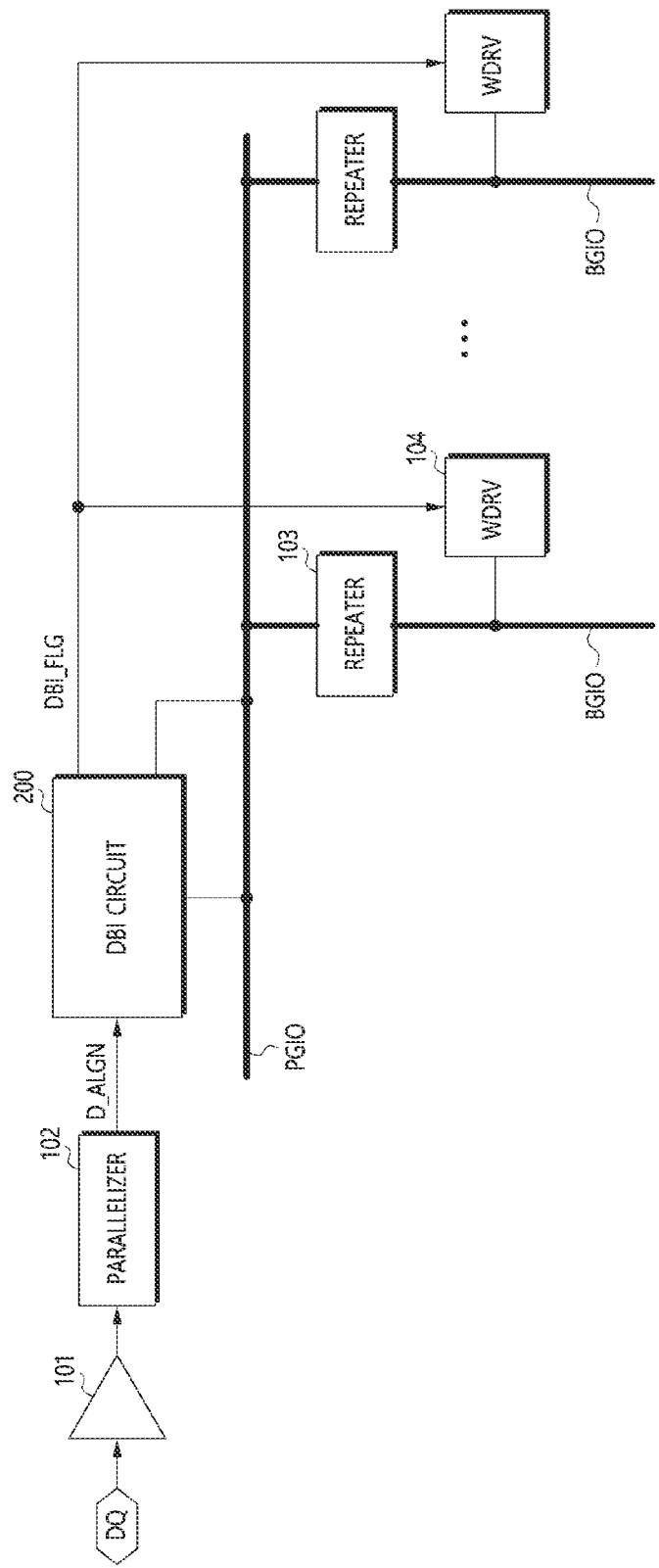
FIG. 2 is a diagram illustrating a data bus inversion circuit according to an embodiment of the present disclosure.

FIG. 2 is a diagram illustrating the DBI circuit 200 according to an embodiment of the present disclosure.

Referring to FIG. 2, the DBI circuit 200 according to an embodiment may be connected between a parallelizer 102 and the first global input/output line PGIO.

An input buffer 101 may be connected to an input/output pad DQ. The parallelizer 102 may be connected to the input buffer 101. The parallelizer 102 may align data that has been input through the input buffer 101 to output alignment data D_ALGN.

The first global input/output line PGIO may be connected to the plurality of second global input/output lines BGIO through a repeater 103. The second global input/output line BGIO may be connected to a write driver (WDRV) 104 of a corresponding memory bank BK.

The DBI circuit 200 may receive, as feedback, data that is transmitted through the first global input/output line PGIO, may store the data as previous data in accordance with the first mode or the second mode. Further, the DBI circuit 200 may output, as a DBI flag DBI_FLG, the results of a comparison between the previous data and the alignment data D_ALGN, that is, current input data, and the results of an additional operation for the previous data and the alignment data D_ALGN. If it is necessary to perform the DBI function as the results of an internal operation, the DBI circuit 200 may activate the DBI flag DBI_FLG to a set level (e.g., a high level). The DBI circuit 200 may output the alignment data D_ALGN by inverting the alignment data D_ALGN, in response to the DBI flag DBI_FLG that has been activated to a high level.

The write driver 104 may write, in the memory region, data that is transmitted through the plurality of second global input/output lines BGIO by inverting the data in response to the DBI flag DBI_FLG.

Figure 3:
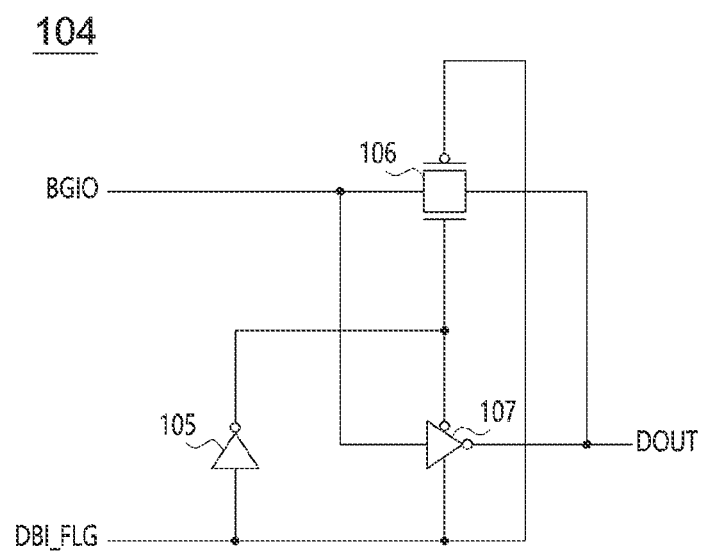
FIG. 3 is a diagram illustrating a write driver in FIG. 2 according to an embodiment of the present disclosure.

FIG. 3 is a diagram illustrating the write driver 104 in FIG. 2 according to an embodiment of the present disclosure.

Referring to FIG. 3, the write driver 104 may include a first logic gate 105, a second logic gate 106, and a third logic gate 107.

The first logic gate 105 may invert the DBI flag DBI_FLG to output the inverted DBI flag. If the DBI flag DBI_FLG has been deactivated, that is, when the level of the output of the first logic gate 105 is a high level, the second logic gate 106 may output data that is transmitted through the plurality of second global input/output lines BGIO without inverting the data. If the DBI flag DBI_FLG has been activated, that is, when the level of the output of the first logic gate 105 is a low level, the third logic gate 107 may invert and output data that is transmitted through the plurality of second global input/output lines BGIO.

Figure 4:
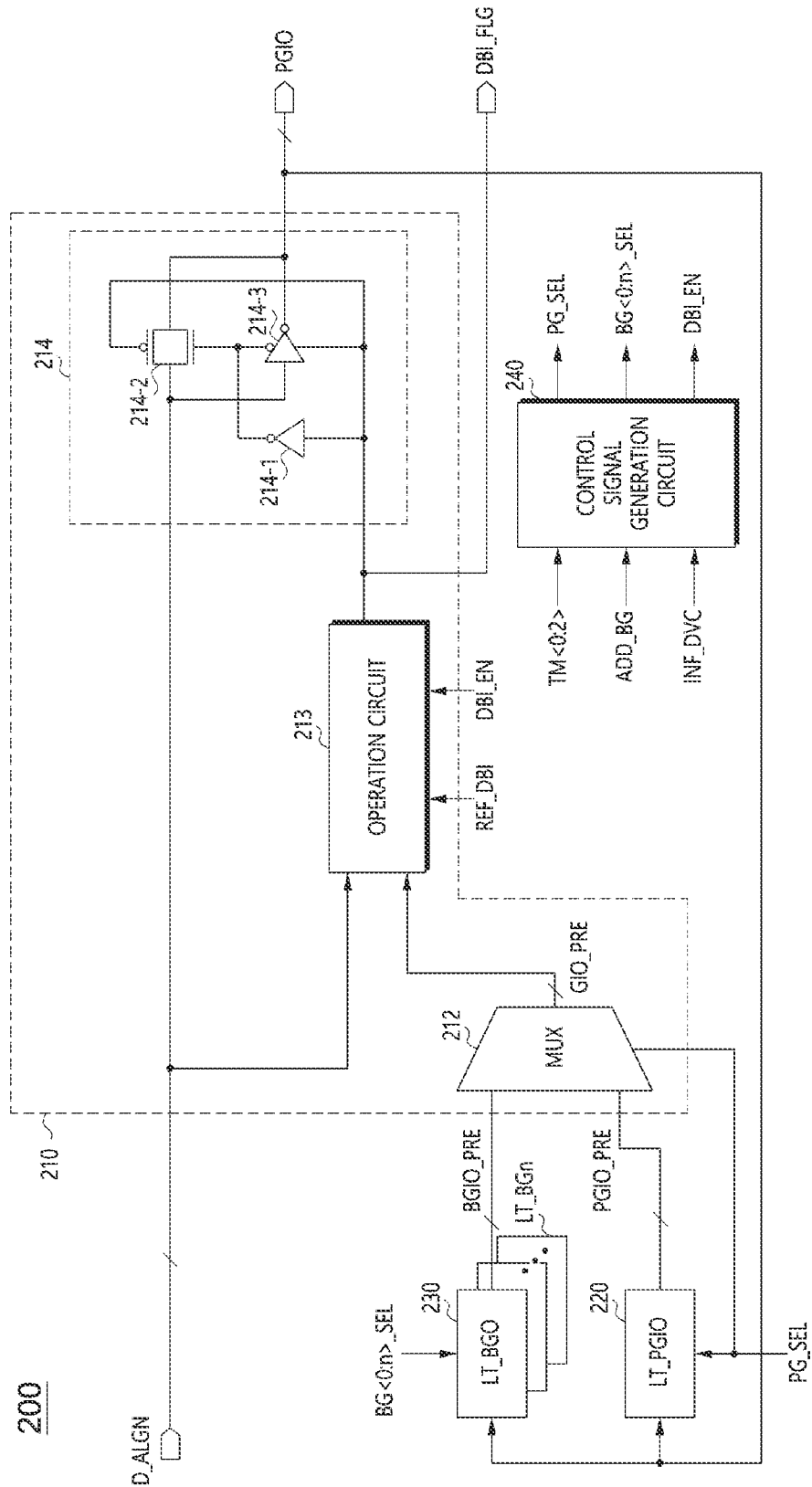
FIG. 4 is a diagram illustrating a data bus inversion circuit according to an embodiment of the present disclosure.

FIG. 4 is a diagram illustrating the DBI circuit 200 according to an embodiment of the present disclosure.

Referring to FIG. 4, the DBI circuit 200 according to an embodiment may include a DBI engine 210, a first latch circuit 220, a second latch circuit 230, and a control signal generation circuit 240.

The first latch circuit (LT_PGIO) 220 may store, as first data, data that is transmitted through the first global input/output line PGIO, in response to a first mode selection signal PG_SEL. If the first mode selection signal PG_SEL has been activated, the first latch circuit 220 may store data that is transmitted through the first global input/output line PGIO.

The second latch circuit (LT_BGO) 230 may store, as a plurality of second data items, data that is transmitted through the first global input/output line PGIO by sorting the data by the plurality of second global input/output lines BGIO, in response to second mode selection signals BG<0:n>_SEL. The second latch circuit 230 may include a plurality of latch units LT_BG0 to LT_BGn. The plurality of latch units LT_BG0 to LT_BGn may correspond to the bank groups BG0 to BG7 in a one-to-one way. The plurality of latch units LT_BG0 to LT_BGn may be activated in response to signal bits having the same order, among the signal bits of the respective second mode selection signals BG<0:n>_SEL. Only a latch unit that is activated, among the plurality of latch units LT_BG0 to LT_BGn, may store input data. In this case, the data that is stored in the activated latch unit is data that is substantially transmitted through the first global input/output line PGIO, but is transmitted to any one of the plurality of second global input/output lines BGIO, as a target. Accordingly, the data that is stored in the activated latch unit has the same logic level as data that is transmitted to a target, among the second global input/output lines BGIO.

For example, if the second mode selection signal BG<0>_SEL, among the second mode selection signals BG<0:n>_SEL, has been activated, the second latch circuit 230 may activate the latch unit LT_BG0, among the plurality of latch units LT_BG0 to LT_BGn. The latch unit LT_BG0 may store data that is transmitted to any second global input/output line that belongs to the plurality of second global input/output lines BGIO and that corresponds to the bank group BG0, via the first global input/output line PGIO. In a subsequent description, the second mode selection signals BG<0:n>_SEL are signals corresponding to address signals for selecting one of the bank groups BG0 to BG7. Accordingly, data that are transmitted through the plurality of latch units LT_BG0 to LT_BGn and the bank groups BG0 to BG7 may be made to correspond to each other in a one-to-one way.

The DBI engine 210 may perform the first mode in which the DBI engine 210 generates the DBI flag DBI_FLG by comparing data PGIO_PRE that is stored in the first latch circuit 220 with current input data, that is, the alignment data D_ALGN or the second mode in which is the DBI engine 210 generates the DBI flag DBI_FLG by comparing data BGIO_PRE that is stored in the second latch circuit 230 with the alignment data D_ALGN. The DBI engine 210 may invert and output the alignment data D_ALGN in response to the DBI flag DBI_FLG.

The DBI engine 210 may include a multiplexer (MUX) 212, an operation circuit 213, and inversion logic 214.

The multiplexer 212 may select and output one of the data PGIO_PRE that is stored in the first latch circuit 220 and the data BGIO_PRE that is stored in the second latch circuit 230, in response to the first mode selection signal PG_SEL. When the level of the first mode selection signal PG_SEL is a high level, the multiplexer 212 may select and output the data PGIO_PRE that has been stored in the first latch circuit 220. When the level of the first mode selection signal PG_SEL is a low level, the multiplexer 212 may select and output the data BGIO_PRE that has been stored in the second latch circuit 230.

The operation circuit 213 may generate the DBI flag DBI_FLG, in response to the alignment data D_ALGN, an output GIO_PRE of the multiplexer 212, a reference value REF_DBI, and an enable signal DBI_EN. If the enable signal DBI_EN has been activated to a high level, the operation circuit 213 may generate the DBI flag DBI_FLG by performing an operation on the alignment data D_ALGN and the output GIO_PRE of the multiplexer 212. If the enable signal DBI_EN has been deactivated, the operation circuit 213 may output the DBI flag DBI_FLG at a deactivation level, that is, at a low level, regardless of the alignment data D_ALGN and the output GIO_PRE of the multiplexer 212.

The inversion logic 214 may invert the alignment data D_ALGN in response to the DBI flag DBI_FLG and transmit the inverted alignment data D_ALGN to the first global input/output line PGIO. The inversion logic 214 may include a first logic gate 214-1, a second logic gate 214-2, and a third logic gate 214-3. The first logic gate 214-1 may invert and output the DBI flag DBI_FLG. If the DBI flag DBI_FLG has been deactivated to a low level, the second logic gate 214-2 may output the alignment data D_ALGN to the first global input/output line PGIO as an original phase without inverting the alignment data D_ALGN. If the DBI flag DBI_FLG has been activated to a high level, the third logic gate 214-3 may invert the alignment data D_ALGN and output the inverted alignment data D_ALGN to the first global input/output line PGIO.

The control signal generation circuit 240 may be configured to generate a plurality of control signals for enabling one of the first mode and the second mode to be automatically selected in response to product information INF_DVC of the semiconductor apparatus. The control signal generation circuit 240 may generate the plurality of control signals, in response to a plurality of test mode signals TM<0:2>, an address signal ADD_BG, and the product information INF_DVC. The plurality of control signals may include the first mode selection signal PG_SEL, the second mode selection signals BG<0:n>_SEL, and the enable signal DBI_EN. The address signal ADD_BG may include an address signal for selecting one of the bank groups BG0 to BG7.

Figure 5:
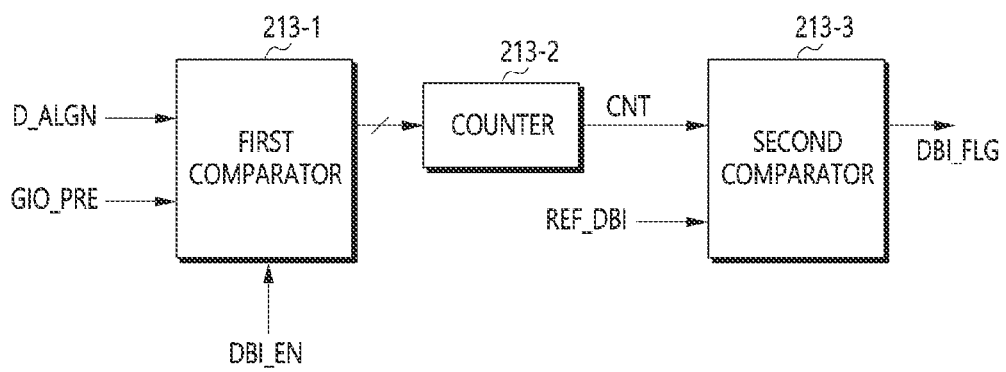
FIG. 5 is a diagram illustrating an operation circuit in FIG. 4 according to an embodiment of the present disclosure.

FIG. 5 is a diagram illustrating the operation circuit 213 in FIG. 4 according to an embodiment of the present disclosure.

Referring to FIG. 5, the operation circuit 213 may include a first comparator 213-1, a counter 213-2, and a second comparator 213-3.

The first comparator 213-1 may output the results of a comparison between the alignment data D_ALGN and the output GIO_PRE of the multiplexer 212. In an embodiment, the first comparator 213-1 may output the results of exclusive OR (XOR) of the alignment data D_ALGN and the output GIO_PRE of the multiplexer 212. When the logic level of the alignment data D_ALGN and the logic level of the output GIO_PRE of the multiplexer 212 are different from each other, the first comparator 213-1 may generate an output signal having a high level. In an embodiment, the first comparator 213-1 may include a plurality of XOR gates for performing exclusive OR on the alignment data D_ALGN and the output GIO_PRE of the multiplexer 212.

The counter 213-2 may output the results of the count of the output of the first comparator 213-1 as a count signal CNT. The counter 213-2 may output, as the count signal CNT, an output having a high level, among the outputs of the first comparator 213-1, by counting the output having a high level.

The second comparator 213-3 may output, as the DBI flag DBI_FLG, the results of a comparison between the count signal CNT and the reference value REF_DBI. When a value of the count signal CNT is greater than or equal to the reference value REF_DBI, the second comparator 213-3 may activate the DBI flag DBI_FLG to a high level. In an embodiment, the reference value REF_DBI may be varied in response to external control.

Figure 6:
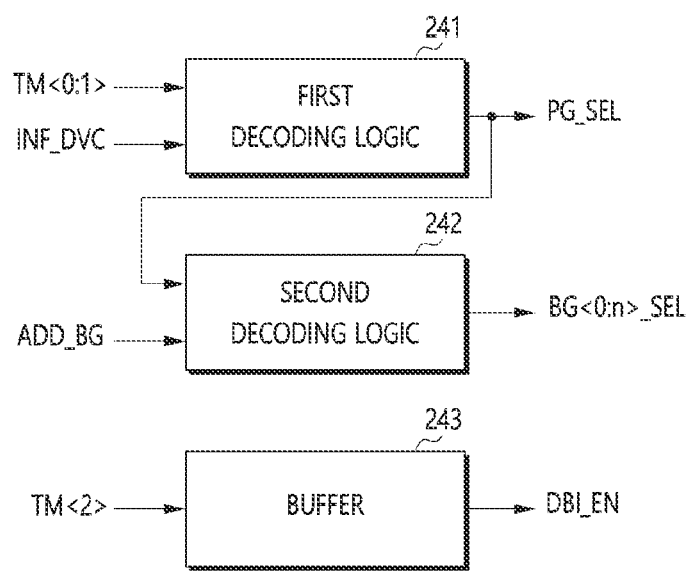
FIG. 6 is a block diagram illustrating a control signal generation circuit in FIG. 4 and is a truth table for describing a corresponding operation thereof, according to an embodiment of the present disclosure.

FIG. 6 is a block diagram illustrating the control signal generation circuit 240 in FIG. 4 and is a truth table for describing a corresponding operation thereof, according to an embodiment of the present disclosure.

Referring to FIG. 6, the control signal generation circuit 240 may include first decoding logic 241, second decoding logic 242, and a buffer 243.

The first decoding logic 241 may output, as the first mode selection signal PG_SEL, the results of the decoding of test mode signals TM<0:1>, among a plurality of test mode signals TM<0:2>, and the product information INF_DVC. The second decoding logic 242 may output, as the second mode selection signals BG<0:n>_SEL, the results of the decoding of the first mode selection signal PG_SEL and the address signal ADD_BG. The buffer 243 may output the test mode signal TM<2> as the enable signal DBI_EN by buffering the test mode signal TM<2>.

Hereinafter, an operation of the control signal generation circuit 240 is described with reference to the truth table in FIG. 6.

The test mode signal TM<0>, among the plurality of test mode signals TM<0:2>, may be used as a signal that determines whether a DBI operation mode (i.e., the first mode/second mode) will be set automatically or manually. For example, when the level of the test mode signal TM<0> is a low level, the control signal generation circuit 240 may automatically set the first mode/second mode in response to the product information INF_DVC. When the level of the test mode signal TM<0> is a high level, the control signal generation circuit 240 may forcedly or manually set the first mode/second mode in response to the test mode signal TM<1>. When the level of the test mode signal TM<1> is a low level, in the state in which the level of the test mode signal TM<0> is a high level, the control signal generation circuit 240 may set the DBI operation mode of the semiconductor apparatus as the first mode. When the level of the test mode signal TM<1> is a high level, in the state in which the level of the test mode signal TM<0> is a high level, the control signal generation circuit 240 may set the DBI operation mode of the semiconductor apparatus as the second mode. The test mode signal TM<2> may be used as a signal for activating the enable signal DBI_EN. When the level of the test mode signal TM<2> is a high level, the control signal generation circuit 240 may activate the enable signal DBI_EN to a high level. When the level of the test mode signal TM<2> is a low level, the control signal generation circuit 240 may deactivate the enable signal DBI_EN to a low level.

When the level of the test mode signal TM<0> is a low level, the DBI operation mode of the semiconductor apparatus may be automatically set as the first mode or the second mode in response to the product information INF_DVC regardless of the test mode signal TM<1>. When the level of the test mode signal TM<0> is a low level and the level of the product information INF_DVC is a low level, the first decoding logic 241 may activate (or enable) the first mode selection signal PG_SEL to a high level, and accordingly the second decoding logic 242 may deactivate all signal bits of the second mode selection signals BG<0:n>_SEL to a low level regardless of the address signal ADD_BG. Accordingly, the DBI operation mode of the semiconductor apparatus may be set as the first mode. When the level of the test mode signal TM<0> is a low level and the level of the product information INF_DVC is a high level, the first decoding logic 241 may deactivate (or disable) the first mode selection signal PG_SEL to a low level, and accordingly the second decoding logic 242 may activate a bit corresponding to the address signal ADD_BG, among all signal bits of the second mode selection signals BG<0: n>_SEL, to a high level. Accordingly, the DBI operation mode of the semiconductor apparatus may be set as the second mode.

When the level of the test mode signal TM<0> is a high level, the DBI operation mode of the semiconductor apparatus may be manually set as the first mode or the second mode in response to the test mode signal TM<1> regardless of the product information INF_DVC. When the level of the test mode signal TM<0> is a high level and the level of the test mode signal TM<1> is a low level, the first decoding logic 241 may activate (or enable) the first mode selection signal PG_SEL to a high level, and accordingly the second decoding logic 242 may deactivate all signal bits of the second mode selection signals BG<0:n>_SEL to a low level regardless of the address signal ADD_BG. Accordingly, the DBI operation mode of the semiconductor apparatus may be set as the first mode. When the level of the test mode signal TM<0> is a high level and the level of the test mode signal TM<1> is a high level, the first decoding logic 241 may deactivate (or disable) the first mode selection signal PG_SEL to a low level, and accordingly the second decoding logic 242 may activate a bit corresponding to the address signal ADD_BG, among all signal bits of the second mode selection signals BG<0:n>_SEL, to a high level. Accordingly, the DBI operation mode of the semiconductor apparatus may be set as the second mode.

Figure 7:
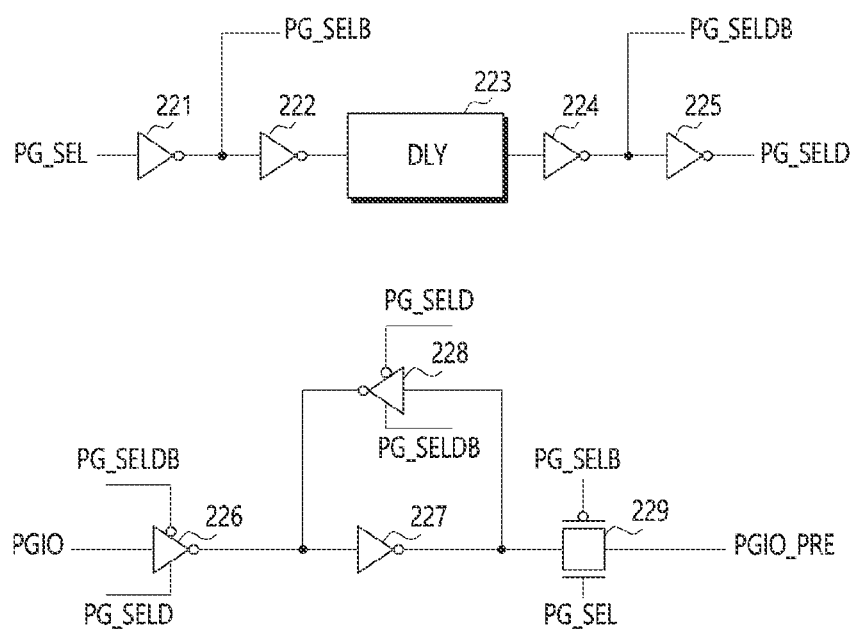
FIG. 7 is a diagram illustrating a first latch circuit in FIG. 4 according to an embodiment of the present disclosure.

FIG. 7 is a diagram illustrating the first latch circuit 220 in FIG. 4 according to an embodiment of the present disclosure.

Referring to FIG. 7, the first latch circuit 220 may include a plurality of logic gates 221 to 229.

First to fifth logic gates 221 to 225 may generate a plurality of timing signals PG_SELB, PG_SELDB, and PG_SELD by delaying the first mode selection signal PG_SEL. A sixth logic gate 226 may make the data of the first global input/output line PGIO pass therethrough in response to the plurality of timing signals PG_SELDB and PG_SELD. Seventh and eighth logic gates 227 and 228 may latch the output of the sixth logic gate 226 in response to the plurality of timing signals PG_SELDB and PG_SELD. The ninth logic gate 229 may output, as an output PGIO_PRE, a signal that has been latched in the seventh and eighth logic gates 227 and 228, in response to the first mode selection signal PG_SEL and the timing signal PG_SELB.

Figure 8:
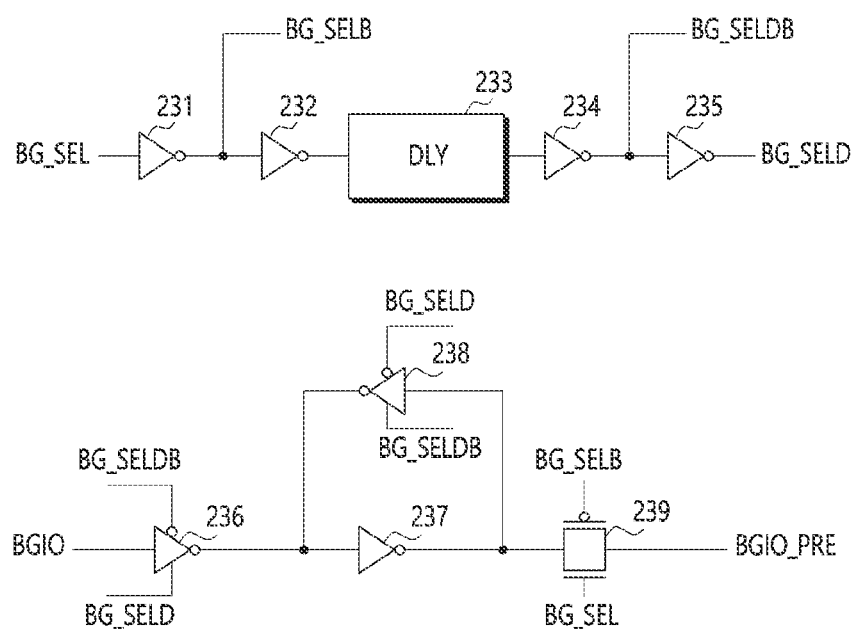
FIG. 8 is a diagram illustrating a second latch circuit in FIG. 4 according to an embodiment of the present disclosure.

FIG. 8 is a diagram illustrating the second latch circuit 230 in FIG. 4 according to an embodiment of the present disclosure.

Referring to FIG. 8, the second latch circuit 230 may include the plurality of latch units LT_BG0 to LT_BGn. The plurality of latch units LT_BG0 to LT_BGn may be identically constructed. Each of the latch units may include a plurality of logic gates 231 to 239.

First to fifth logic gates 231 to 235 may generate a plurality of timing signals BG_SELB, BG_SELDB, and BG_SELD by delaying one signal (called BG_SEL for convenience sake) corresponding thereto, among the second mode selection signals BG<0:n>_SEL. A sixth logic gate 236 may make the data of the second global input/output line BGIO pass therethrough in response to the plurality of timing signals BG_SELDB and BG_SELD. Seventh and eighth logic gates 237 and 238 may latch the output of the sixth logic gate 236 in response to the plurality of timing signals BG_SELDB and BG_SELD. The ninth logic gate 239 may output, as an output BGIO_PRE, a signal that has been latched in the seventh and eighth logic gates 237 and 238, in response to the signal BG_SEL and the timing signal BG_SELB.

Figure 9:
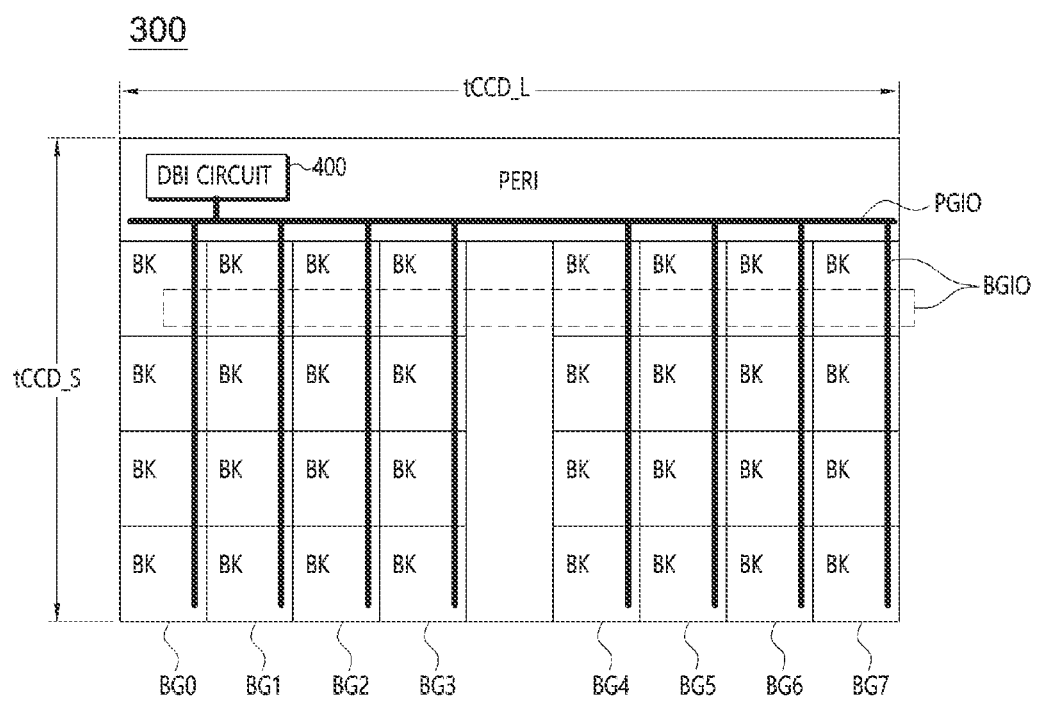
FIG. 9 is a diagram illustrating a semiconductor apparatus according to another embodiment of the present disclosure.

FIG. 9 is a diagram illustrating a semiconductor apparatus 300 according to another embodiment of the present disclosure.

Referring to FIG. 9, the semiconductor apparatus 300 according to another embodiment may include a memory region, a peripheral circuit region PERI, a first global input/output line PGIO, and a plurality of second global input/output lines BGIO.

The memory region may include a plurality of bank groups BG0 to BG7. Each of the bank groups may include a plurality of memory banks BK.

The peripheral circuit region PERI may include various types of circuit elements and a DBI circuit 400 for signal interfacing with the memory region and the outside of the semiconductor apparatus 300.

The first global input/output line PGIO may be connected to the peripheral circuit region PERI, and may be disposed in the peripheral circuit region PERT.

The plurality of second global input/output lines BGIO may have one ends connected to the first global input/output line PGIO in common, and may have the other ends connected to the bank groups BG0 to BG7, respectively.

The DBI circuit 400 may be constructed identically with the DBI circuit 200 that has been described with reference to FIGS. 2 to 8. The DBI circuit 400 may be configured to selectively perform the first mode and the second mode. The DBI circuit 400 may be configured to automatically select one of the first mode and the second mode in response to product information of the semiconductor apparatus. The DBI circuit 200 may be configured to select the first mode in response to the product information having a value that defines that a tCCD value within the same bank group is less than a tCCD value between different bank groups. The DBI circuit 200 may be configured to select the second mode in response to the product information having a value that defines that a tCCD value within the same bank group is greater than a tCCD value between different bank groups.

The semiconductor apparatus 300 of FIG. 9 corresponds to an example in which the tCCD value (tCCD_L) between different bank groups has been designed to be greater than the tCCD value (tCCD_S) within the same bank group. Accordingly, the semiconductor apparatus 300 may operate in the first mode according to an automatic selection mode, and may operate either in the first mode or the second mode according to a manual selection mode.

Accordingly, the semiconductor apparatus 300 according to an embodiment can automatically select a DBI mode that is suitable for a product design method, that is, the first mode and the second mode, and the first mode and the second mode can be manually selected based on a product operation characteristic. Accordingly, noise and power consumption of the semiconductor apparatus can be reduced regardless of a product type.

As described above, those skilled in the art to which the present disclosure pertains may understand that the present disclosure may be implemented in various other forms without departing from the technical spirit or essential characteristics of the present disclosure. Accordingly, it is to be understood that the aforementioned embodiments are illustrative from all aspects not being limitative. The scope of the present disclosure is defined by the appended claims rather than by the detailed description, and all modifications or variations derived from the meanings and scope of the claims and equivalents thereof should be understood as being included in the scope of the present disclosure and the following claims. Furthermore, the embodiments may be combined to form additional embodiments.

What is claimed is:

1. A data bus inversion circuit comprising:
a first latch circuit configured to store, as first data, data that is transmitted through a first signal line;
a second latch circuit configured to store, as a plurality of second data items, the data that is transmitted through the first signal line by sorting the data by a plurality of second signal lines that are connected to the first signal line in common; and
a data bus inversion engine configured to selectively perform a first mode and a second mode,
wherein in the first mode, the data bus inversion engine generates a data bus inversion flag by comparing the first data with input data, and
wherein in the second mode, the data bus inversion engine generates the data bus inversion flag by comparing the plurality of second data items with the input data.

2. The data bus inversion circuit according to claim 1, wherein the data bus inversion engine comprises:
a multiplexer configured to selectively output one of the first data and the plurality of second data items,
an operation circuit configured to generate the data bus inversion flag by performing an operation on the input data and an output of the multiplexer, and
inversion logic configured to output the input data through the first signal line by inverting the input data in response to the data bus inversion flag.

3. The data bus inversion circuit according to claim 2, wherein the operation circuit comprises:
a first comparator configured to output a result of a comparison between the input data and the output of the multiplexer,
a counter configured to output a result of a count of the output of the first comparator as a count signal, and
a second comparator configured to output a result of a comparison between the count signal and a reference value as the data bus inversion flag.

4. The data bus inversion circuit according to claim 1, wherein:
the first latch circuit, the second latch circuit, and the data bus inversion engine are configured to operate in response to a plurality of control signals, and
the data bus inversion circuit further comprising a control signal generation circuit configured to generate the plurality of control signals for enabling one of the first mode and the second mode to be selected in response to product information of a semiconductor apparatus.

5. The data bus inversion circuit according to claim 4, wherein the control signal generation circuit comprises:
first decoding logic configured to generate, as one of the plurality of control signals, a first mode selection signal for activating the first latch circuit in response to the product information, and
second decoding logic configured to generate, as another one of the plurality of control signals, a second mode selection signal for activating the second latch circuit in response to the first mode selection signal and an address signal.

6. A semiconductor apparatus comprising:
a first global input/output line disposed in a peripheral circuit region;
a plurality of second global input/output lines connected with the first global input/output line in common and disposed in a memory region; and
a data bus inversion circuit configured to selectively perform a first mode and a second mode,
wherein in the first mode, the data bus inversion circuit stores, as first data, data that is transmitted through the first global input/output line and generates a data bus inversion flag based on a result of a comparison between the first data and input data, and
wherein in the second mode, the data bus inversion circuit stores, as a plurality of second data items, the data that is transmitted through the first global input/output line by sorting the data by the plurality of second global input/output lines and generates the data bus inversion flag based on a result of a comparison between second data, selected among the plurality of second data items, and the input data.

7. The semiconductor apparatus according to claim 6, wherein the data bus inversion circuit comprises:
a first latch circuit configured to store, as the first data, the data that is transmitted through the first global input/output line,
a second latch circuit configured to store, as the plurality of second data items, the data that is transmitted through the first global input/output line by sorting the data by the plurality of second global input/output lines, and
a data bus inversion engine configured to generate the data bus inversion flag based on a result of a comparison between the first data, one of the plurality of second data items, and the input data.

8. The semiconductor apparatus according to claim 6, wherein the data bus inversion circuit is configured to select one of the first mode and the second mode in response to product information of the semiconductor apparatus.

9. The semiconductor apparatus according to claim 6, wherein the data bus inversion circuit is configured to
select the first mode in response to product information having a value that defines that a column to column delay (tCCD) value within an identical bank group is less than a tCCD value between different bank groups, and
select the second mode in response to the product information having a value that defines that the tCCD value within the identical bank group is greater than the tCCD value between the different bank groups.

10. The semiconductor apparatus according to claim 7, wherein the data bus inversion engine comprises:
a multiplexer configured to selectively output one of the first data and the plurality of second data items in response to a first mode selection signal,
an operation circuit configured to generate the data bus inversion flag by performing an operation on the input data and an output of the multiplexer, and
inversion logic configured to invert the input data in response to the data bus inversion flag and output the inverted input data to the first global input/output line.

11. The semiconductor apparatus according to claim 10, wherein the operation circuit comprises:
a first comparator configured to output a result of a comparison between the input data and the output of the multiplexer,
a counter configured to output a result of a count of the output of the first comparator as a count signal, and a second comparator configured to output a result of a comparison between the count signal and a reference value as the data bus inversion flag.

12. A semiconductor apparatus comprising:
a memory region including a plurality of memory bank groups;
a peripheral circuit region connected to input/output pads;
a first global input/output line connected to the peripheral circuit region;
a plurality of second global input/output lines including one ends connected to the first global input/output line in common and including other ends connected to the plurality of memory bank groups, respectively; and
a data bus inversion circuit configured to selectively perform a first mode and a second mode,
wherein in the first mode, the data bus inversion circuit stores, as first data, data that is transmitted through the first global input/output line and generates a data bus inversion flag based on a result of a comparison between the first data and input data through the input/output pads, and
wherein in the second mode, the data bus inversion circuit stores, as a plurality of second data items, the data that is transmitted through the first global input/output line by sorting the data by the plurality of memory bank groups and generates the data bus inversion flag based on a result of a comparison between second data, selected among the plurality of second data items, and the input data through the input/output pads.

13. The semiconductor apparatus according to claim 12, further comprising a parallelizer configured to provide the input data to the data bus inversion circuit by parallelizing the input data through the input/output pads.

14. The semiconductor apparatus according to claim 12, further comprising a plurality of write drivers configured to invert data that is transmitted through the plurality of second global input/output lines in response to the data bus inversion flag, and write, in the memory region, the inverted data.

15. The semiconductor apparatus according to claim 12, wherein the data bus inversion circuit is configured to select one of the first mode and the second mode in response to product information of the semiconductor apparatus.

16. The semiconductor apparatus according to claim 12, wherein the data bus inversion circuit is further configured to
select the first mode in response to product information which defines that a column to column delay (tCCD) value within an identical bank group is less than a tCCD value between different bank groups, and
select the second mode in response to the product information which defines that the tCCD value within the identical bank group is greater than the tCCD value between the different bank groups.

17. The semiconductor apparatus according to claim 15, wherein the data bus inversion circuit is configured to enable one of the first mode and the second mode to be selected regardless of the product information of the semiconductor apparatus in response to a test mode signal.

18. The semiconductor apparatus according to claim 15, wherein the data bus inversion circuit comprises:
a first latch circuit activated in response to a first mode selection signal and configured to store, as the first data, the data that is transmitted through the first global input/output line,
a second latch circuit activated in response to a second mode selection signal and configured to store, as the plurality of second data items, the data that is transmitted through the first global input/output line by sorting the data by the plurality of memory bank groups,
a data bus inversion engine configured to select the first data or the plurality of second data items in response to the first mode selection signal and to generate the data bus inversion flag based on a result of a comparison between the selected data and the input data, and
a control signal generation circuit configured to generate the first mode selection signal and the second mode selection signal in response to an address signal that is related to a selection of the plurality of memory bank groups and the product information.

19. The semiconductor apparatus according to claim 18, wherein the data bus inversion engine comprises:
a multiplexer configured to selectively output one of the first data and the plurality of second data items in response to the first mode selection signal,
an operation circuit configured to generate the data bus inversion flag by performing an operation on the input data and an output of the multiplexer, and
inversion logic configured to invert the input data in response to the data bus inversion flag and output the inverted input data through the first global input/output line.

20. The semiconductor apparatus according to claim 19, wherein the operation circuit comprises:
a first comparator configured to output a result of a comparison between the input data and the output of the multiplexer,
a counter configured to output a result of a count of the output of the first comparator as a count signal, and
a second comparator configured to output a result of a comparison between the count signal and a reference value as the data bus inversion flag.

21. The semiconductor apparatus according to claim 18, wherein the control signal generation circuit comprises:
first decoding logic configured to generate the first mode selection signal in response to the product information,
second decoding logic configured to generate the second mode selection signal in response to the first mode selection signal and the address signal, and
a buffer configured to output another one of a plurality of test mode signals as an enable signal for activating the data bus inversion engine.

22. A semiconductor apparatus comprising:
a first global input/output line;
a plurality of second global input/output lines;
a plurality of memory bank groups arranged between the first global input/output line and the plurality of second global input/output lines;
a data bus inversion circuit configured to generate a data bus inversion flag based on information associated with column to column delay (tCCD) values of the memory bank groups; and
a plurality of write drivers configured to receive second data of the plurality of second global input/output lines, selectively invert the second data based on the data bus inversion flag, and write the second data or the inverted second data to the plurality of memory bank groups,
wherein the data bus inversion flag is generated based on a comparison result between first data of the first global input/output line and input data of input/output pads, or a comparison result between the second data and the input data.

* * * * *